(12) United States Patent
Caruso et al.

(10) Patent No.: US 10,584,678 B2
(45) Date of Patent: Mar. 10, 2020

(54) SHEAR WEB FOR A WIND TURBINE ROTOR BLADE

(71) Applicant: General Electric Company, Schenectady, NY (US)

(72) Inventors: Christopher Daniel Caruso, Greenville, SC (US); Aaron A. Yarbrough, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1226 days.

(21) Appl. No.: 14/841,870

(22) Filed: Sep. 1, 2015

(65) Prior Publication Data

US 2017/0058868 A1 Mar. 2, 2017

(51) Int. Cl.
*F03D 1/06* (2006.01)
*B23P 15/04* (2006.01)

(52) U.S. Cl.
CPC ............ *F03D 1/0683* (2013.01); *B23P 15/04* (2013.01); *F05D 2230/60* (2013.01); *Y02E 10/721* (2013.01)

(58) Field of Classification Search
CPC ...... B23P 15/04; F03D 1/0683; F03D 1/0675; F03D 80/10; F05D 2230/60; Y02E 10/721
USPC .................................................... 416/5, 226
See application file for complete search history.

(56) References Cited

U.S. PATENT DOCUMENTS

| | | |
|---|---|---|
| 6,264,877 B1 | 7/2001 | Pallu De La Barriere |
| 7,625,185 B2 | 12/2009 | Wobben |
| 8,317,479 B2 | 11/2012 | Vronsky et al. |
| 8,353,674 B2 | 1/2013 | Bech |
| 8,540,491 B2 | 9/2013 | Gruhn et al. |
| 8,657,581 B2 | 2/2014 | Pilpel et al. |
| 8,673,106 B1 | 3/2014 | Jolley et al. |
| 8,747,098 B1 | 6/2014 | Johnson et al. |
| 8,961,142 B2 | 2/2015 | Wansink |
| 8,992,813 B2 | 3/2015 | Robbins et al. |
| 2002/0102161 A1* | 8/2002 | Nordhoff ................ F03D 80/10 416/5 |
| 2009/0148300 A1 | 6/2009 | Driver et al. |
| 2011/0097211 A1 | 4/2011 | Rudling |

(Continued)

FOREIGN PATENT DOCUMENTS

| | | |
|---|---|---|
| CN | 101906251 | 8/2010 |
| JP | 2007-92716 | 4/2007 |

(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

*Primary Examiner* — Patrick Hamo
*Assistant Examiner* — Paul W Thiede
(74) *Attorney, Agent, or Firm* — Dority & Manning, P.A.

(57) ABSTRACT

The present subject matter is directed to a rotor blade assembly for a wind turbine having an improved shear web configuration. The rotor blade assembly includes an upper shell member having a spar cap configured on an internal surface thereof and a lower shell member having a spar cap configured on an internal surface thereof. The shear web extends between the spar caps along a longitudinal length of the blade. Further, the shear web includes at least one pultruded component defining a hollow cross-section.

4 Claims, 10 Drawing Sheets

(56) References Cited

U.S. PATENT DOCUMENTS

| | | |
|---|---|---|
| 2012/0039720 A1 | 2/2012 | Bech |
| 2013/0164133 A1 | 6/2013 | Grove-Nielsen |
| 2013/0216388 A1 | 8/2013 | Akhtar et al. |
| 2013/0333823 A1 | 12/2013 | Hedges et al. |
| 2014/0003956 A1 | 1/2014 | Lull et al. |
| 2014/0295187 A1 | 10/2014 | Jacobsen et al. |
| 2015/0224759 A1 | 8/2015 | Boon |
| 2015/0224760 A1 | 8/2015 | Eyb et al. |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

\* cited by examiner

SHEAR WEB FOR A WIND TURBINE ROTOR BLADE

FIELD OF THE INVENTION

The present invention relates generally to the field of wind turbines, and more particularly to the shear web configuration within the wind turbine blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

The rotor blades typically consist of a suction side shell and a pressure side shell that are bonded together at bond lines along the leading and trailing edges of the blade. An internal shear web extends between the pressure and suction side shell members and is bonded to spar caps affixed to the inner faces of the shell members. Relatively exact length dimensions are required for the shear web to span between the spar caps and achieve a bond between the spar caps and shear web having sufficient width and thickness dimensions. Achieving these dimensions, as well as an adequate bond, can be difficult and the juncture between the spar caps and shear web is a time-consuming and tedious process that often requires significant re-work.

With typical blade configurations, the shear web is a continuous member that spans between the spar caps and a rigid flange is used to achieve a desired bond width for bond paste applied between the spar caps and transverse ends of the shear web. This configuration, however, places significant stresses at the juncture between the shear web and spar cap and often results in the use of excess bond paste to achieve a desired bond width at this critical juncture. The excess paste contributes unnecessary weight to the blade and can break off and result in blade "rattling" during operation of the wind turbine (a not uncommon complaint from wind turbine owners/operators). Also, air voids and unpredictable squeeze-out of the bond paste in the typical configurations can result in areas of decreased bond strength, which is particularly problematic in sections of the blade where repair is not possible from within the rotor blade.

In addition, conventional shear webs are constructed using reinforced laminate composite materials formed, for example, via vacuum infusion. Though such materials provide the desired strength and/or stiffness for the component, the materials add additional weight to the wind turbine.

Accordingly, the industry would benefit from an improved shear web that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes an upper shell member having an upper spar cap configured on an internal surface thereof and a lower shell member having a lower spar cap configured on an internal surface thereof. A shear web extends between the spar caps along a longitudinal length of the blade. Further, the shear web includes at least one pultruded component defining a hollow cross-section. In addition, the pultruded component(s) is constructed, at least in part, of a reinforced composite laminate material.

In one embodiment, the shear web may include a plurality of pultruded components stacked in a flap-wise direction between the upper and lower spar caps. In addition, in certain embodiments, the shear web may also include an outer skin layer at least partially enclosing the plurality of stacked pultruded components.

In another embodiment, the shear web may include first and second core components. In certain embodiments, the first and second core components may be constructed, at least in part, of at least one of foam, cork, composites, balsa wood, or similar. More specifically, the first core component may be secured to and extend from the upper shell member, whereas the second core component may be secured to and extend from the lower shell member. Thus, in such embodiments, the pultruded component(s) may be positioned between the first and second core components, e.g. between the ends of the first and second core components. In addition, the shear web may include an outer skin layer at least partially enclosing the first and second core components and pultruded component(s) arranged therebetween.

In further embodiments, the pultruded component may include a first pultruded member and a second pultruded member. More specifically, the first pultruded member may include at least one first flange. Similarly, the second pultruded member may include at least one second flange. Thus, in such embodiments, the first and second flanges may be arranged together at a joint. In additional embodiments, at least one of the first and second flanges may also include one or more protrusions configured to provide a predetermined joint thickness when arranged with an opposite flange. Thus, the predetermined joint thickness may be configured to control an adhesive thickness between the first and second pultruded members at the joint.

In yet another embodiment, the first and second pultruded members may also include first and second aligning features configured to receive the first and second core components, respectively. For example, in certain embodiments, the first and second aligning features may include recesses, cavities, notches, or similar configured to receive and/or maintain the location of the first and second core components. In addition, the aligning features are configured to receive an adhesive so as to secure the first and second core components therein.

In additional embodiments, the shear web may also include an adhesive configured at the joint of the first and second flanges. More specifically, in certain embodiments, adhesives as described herein may include any one of or a combination of the following: bond paste, binder, tape, gum, wax, plaster, grout, resin, epoxy, sealant, glue, or similar.

In further embodiments, the rotor blade assembly may also include a lightning protection system having a down conductor cable. Thus, the down conductor cable may be configured within the hollow cross-section of one of the pultruded components.

In another aspect, the present disclosure is directed to a rotor blade assembly for a wind turbine. The rotor blade assembly includes an upper shell member having at least one upper spar cap configured on an internal surface thereof and a lower shell member having at least one lower spar cap configured on an internal surface thereof. Further, the rotor blade assembly includes a shear web extending between the spar caps along a longitudinal length of the rotor blade. The shear web includes a first core component having first and second ends and a second core component having first and second ends. Thus, the first core component is secured to the upper shell member at its first end and extends longitudinally therefrom to its second end. Similarly, the second core component is secured to the lower shell member at its first end and extends longitudinally therefrom to its second end. In addition, at least one structural component having a hollow cross-section is positioned between the second ends of the first and second core components.

More specifically, in certain embodiments, the shear web defines a height between the upper and lower spar caps. Thus, the structural component(s) may be positioned at about 40% to about 60% of the height of the shear web from the lower spar cap. Alternatively, the structural component(s) may be positioned less than 40% of the height from the lower spar cap or greater than 60% of the height from the lower spar cap.

In yet another aspect, the present disclosure is directed to a method for manufacturing a rotor blade assembly of a wind turbine. The method includes providing a body shell of a rotor blade having at least one spar cap configured on an internal surface thereof. The method also includes forming a shear web from at least one pultruded component defining a hollow cross-section. Another step of the method includes securing the shear web to the at least one spar cap.

In one embodiment, the body shell may include an upper shell member having at least one upper spar cap configured on an internal surface thereof and a lower shell member having at least one lower spar cap configured on an internal surface thereof. Thus, in such embodiments, the method may include forming the shear web between the upper and lower spar caps. Thus, in another embodiment, the step of securing the shear web to the at least one spar cap may include bonding the shear web to the upper and lower spar caps of the upper and lower shell members via at least one of an adhesive or a resin.

In further embodiments, the step of forming the shear web from at least one pultruded component may also include arranging a plurality of pultruded components between the upper and lower shell members in a flap-wise direction and placing an outer skin layer at least partially around the plurality of pultruded components.

In alternative embodiments, the method may include securing first and second core components to the upper and lower shell members, respectively, positioning the at least one pultruded component between the ends of the first and second core components, and placing an outer skin layer at least partially around the first and second core components and the at least one pultruded component arranged therebetween.

In additional embodiments, the step of forming the shear web from at least one pultruded component may include arranging a first pultruded member with a first core component, the first pultruded member having at least one first flange, arranging a second pultruded member with a second core component, the second pultruded member having at least one second flange, aligning the first and second flanges together at a joint, and securing the first and second flanges together. More specifically, in certain embodiments, the step of arranging the first and second pultruded members with the first and second core components may include inserting the first and second core components into aligning features of the first and second pultruded members.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
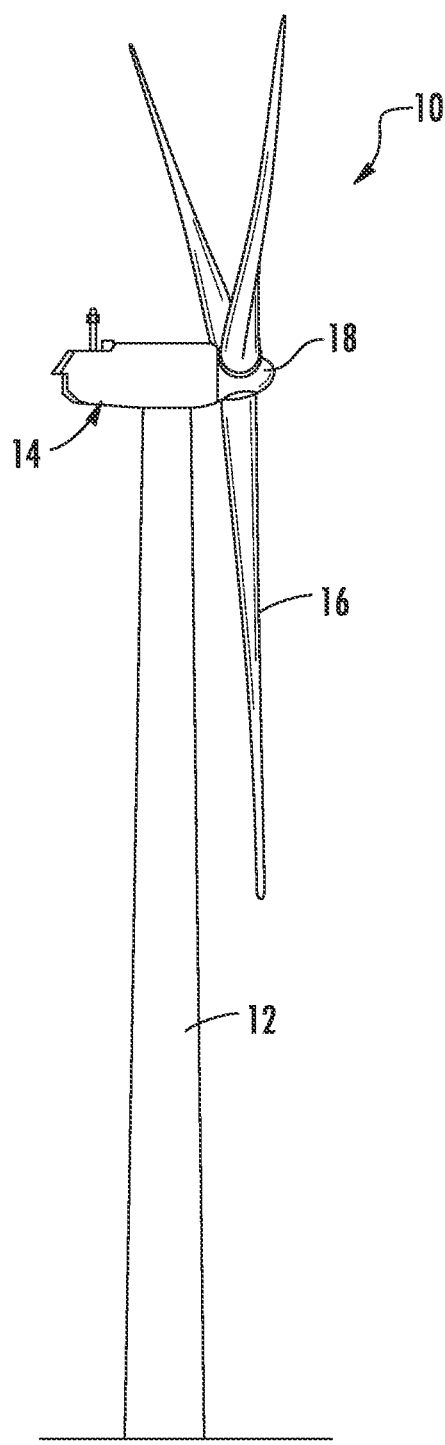
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present disclosure is directed to a rotor blade assembly for a wind turbine having an improved shear web configuration. The rotor blade assembly includes upper and lower shell members having upper and lower spar caps configured on an internal surface thereof. The shear web extends between the upper and lower spar caps along a longitudinal length of the blade. Further, the shear web includes at least one structural (e.g. pultruded) component defining a hollow cross-section.

The present subject matter provides numerous advantages not present in the prior art. For example, the pultruded component(s) in the shear web can provide additional stiffness and/or strength to the rotor blade without adding additional weight. Further, the pultruded component(s) can be incorporated into the shear web to create a higher tolerance joint, enable better bond thickness control, and/or to facilitate web alignment during shell closing. Thus, the present disclosure can improve web bonding quality and/or manufacturing time. In addition, the hollow pultruded component(s) can provide a conduit for installing and housing a down conductor cable of a lightning protection system for the wind turbine, thus enabling quick and easy installation and/or replacement of an existing cable.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
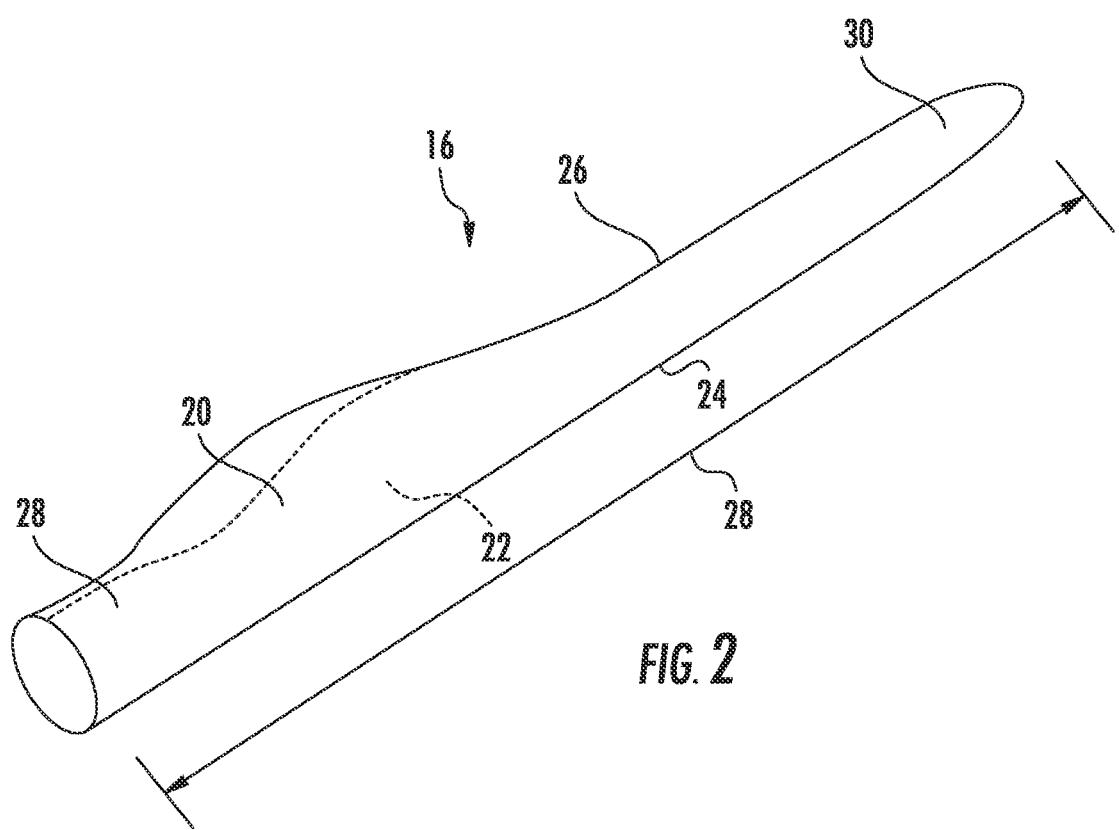
FIG. 2 illustrates a perspective view of one embodiment of a rotor blade of a wind turbine according to the present disclosure.

Referring now to FIG. 2, a more detailed view of one of the rotor blades 16 of FIG. 1 is illustrated. As shown, the rotor blade 16 includes an upper shell member 20 and a lower shell member 22. Further, the upper shell member 20 is configured as the suction side surface of the blade 16, while the lower shell member 22 is configured as the pressure side surface of the blade 16. The rotor blade 16 also includes a leading edge 24 and a trailing edge 26, as well as a root portion 28 and a tip portion 30. As is well known in the art, the upper shell member 20 and the lower shell member 22 may be joined together at the leading edge 24 and trailing edge 26 or any other suitable location. The rotor blade 16 also includes an internal cavity 25 (FIG. 3) in which various structural members, such as spar caps 32, 34 and one or more shear webs 30 according to the present disclosure, may be configured.

Referring now to FIGS. 3-9, various cross-sectional views of the rotor blade 16 of FIG. 2 are illustrated that incorporate various aspects of the present invention. As shown, the upper shell member 20 contains an upper spar cap 32 configured on an internal surface thereof. Similarly, the lower shell member 22 contains a lower spar cap 34 configured on an internal surface thereof. The shear web 30 extends between the spar caps 32, 34 along a longitudinal length of the blade 16 in a generally span-wise direction. Further, as shown generally in the figures, the shear web 30 includes at least one structural component 28 defining a hollow cross-section 29. In addition, the structural component 28 generally extends in a generally span-wise direction. As such, the structural component 28 may define a length that extends generally the length of the rotor blade 16. Alternatively, the structural component may be segmented such that various segments are spaced apart down the span of the rotor blade 16. In such embodiments, a segmented structural component 28 may be easier to manufacture. In addition, a segmented structural component 28 may provide easier installation of a down conductor cable 70, which is discussed in more detail below.

More specifically, in certain embodiments, the structural component 28 may include a pultruded component. In alternative embodiments, the structural component(s) 28 of the shear web 30 may include a pipe, tube, or any other component constructed of any suitable material having a hollow cross-section 29. For example, the structural component(s) as described herein may be constructed of a reinforced laminate composite material, plastic, metal, or any other suitable material. Further, as used herein, the term "structural component" generally encompasses any suitable component that forms part of the shear web structure. In addition, the cross-section may have any suitable shape. For example, as shown, the cross-section may have a generally square or rectangular shape. In further embodiments, the cross-section may have a circular shape.

In particular embodiments, the pultruded component(s) 28 may be constructed, at least in part, of a thermoset material or a thermoplastic material. As used herein, the terms "pultruded component" or similar generally encompass reinforced materials (e.g. fibers or woven or braided strands) that are impregnated with a resin (e.g. a thermoset or a thermoplastic polymer) and pulled through a stationary die such that the resin cures or undergoes polymerization. As such, the process of manufacturing pultruded components is typically characterized by a continuous process of composite materials that produces composite parts having a constant cross-section. Thus, the pultruded components may be constructed of reinforced thermoset or thermoplastic materials. In addition, the pultruded components may be produced from rovings, which generally encompass long and narrow bundles of fibers that are not combined until joined by a cured resin.

A thermoplastic material as described herein generally encompasses a plastic material or polymer that is reversible in nature. For example, thermoplastic materials typically become pliable or moldable when heated to a certain temperature and solidify upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, a thermoset material as described herein generally encompasses a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, esters, epoxies, or any other suitable thermoset material.

In addition, in certain embodiments, the shear web 30 generally defines a height 35 between the upper and lower spar caps 32, 34 along a web axis (B). Thus, the structural component 28 may be positioned at any flap-wise location between the upper and lower spar caps 32, 34. As used herein, the term "flap-wise" direction generally refers to the direction parallel to a line connecting the upper and lower spar caps 32, 24, such as web axis (B). The web axis (B) may be generally perpendicular to a blade axis (A) drawn in a chord-wise direction between the leading edge 24 and the trailing edge 26. In certain embodiments, as shown in FIGS. 3-5 and 9, the structural component(s) 28 may be positioned at about 40% to about 60% of the height 35 of the shear web 30 in a flap-wise direction from the lower spar cap 34. Alternatively, the structural component(s) 28 may be positioned less than 40% of the height from the lower spar cap 34 or greater than 60% of the height of the shear web 30 in a flap-wise direction from the lower spar cap 34.

Figure 3:
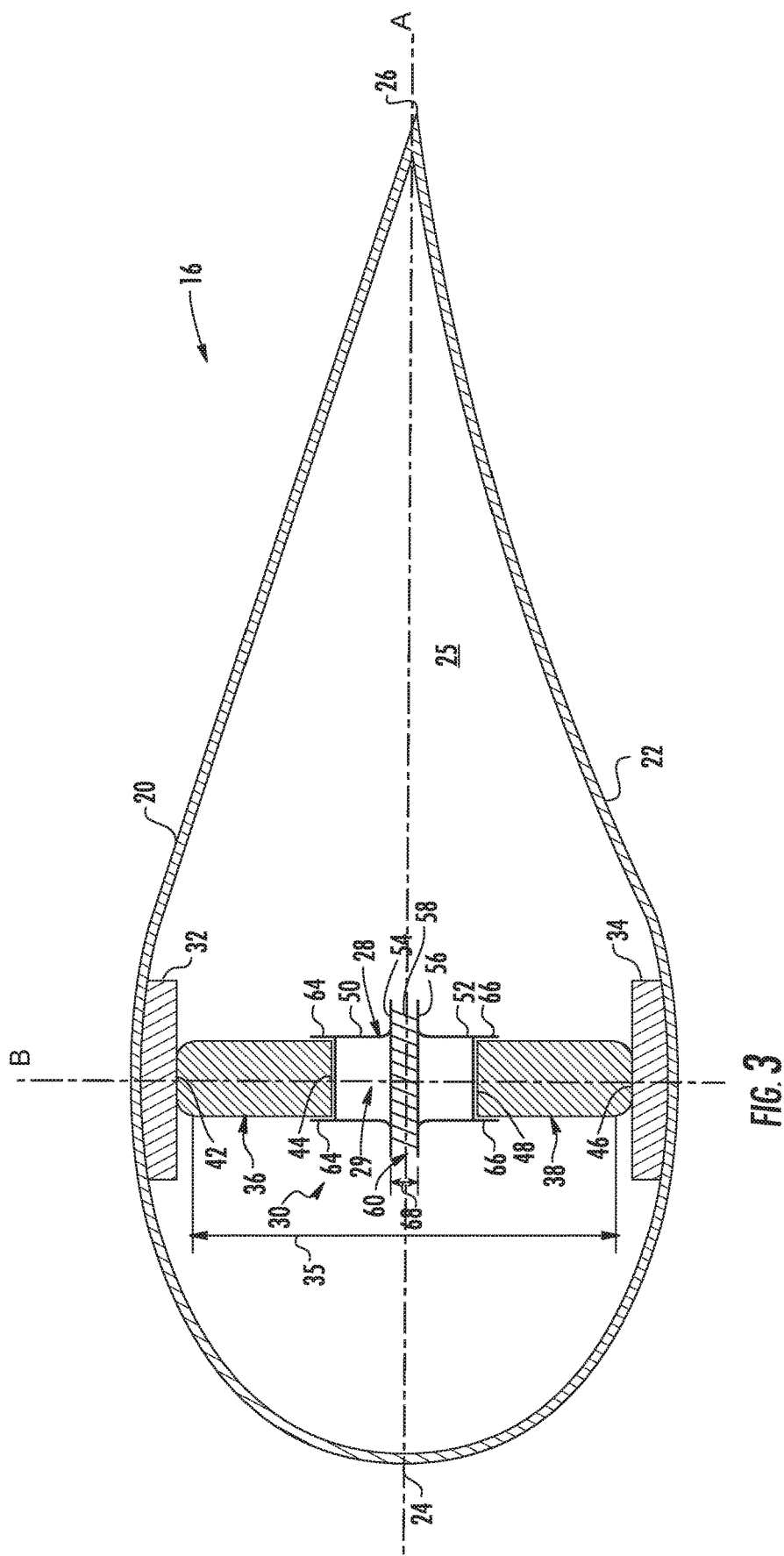
FIG. 3 illustrates a cross-sectional view of one embodiment of a rotor blade of a wind turbine according to the present disclosure.

Referring particularly to FIG. 3, in certain embodiments, the shear web 30 may also include first and second core components 36, 38. More specifically, as shown, the first core component 36 may have a first end 42 and a second end 44. Thus, the first core component may be secured to the upper shell member 20 at its first end 42 and may extend longitudinally (e.g. in a flap-wise direction) to its second end 44. Similarly, the second core component 38 may have a first end 46 and a second end 48. Thus, the second core component 38 may be secured to the lower shell member 22 at its first end 46 and may extend longitudinally to its second end 48. As such, in various embodiments, the core components 36, 38 may be affixed to respective spar caps 32, 34 by any suitable bonding or attachment means, e.g. by directly molding or infusing the components 36, 38 with the spar caps 32, 34 or via an adhesive. Further, the core components 36, 38 may extend substantially perpendicular from the respective spar caps 32, 34. In such embodiments, as shown in FIGS. 3-5 and 9, the pultruded component(s) 28 may be positioned between the second ends 44, 48 of the first and second core components 36, 38. It should be understood that the first and second core components 36, 38 may be constructed of any suitable materials, including but not limited to low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), other foam rubbers/resin-based foams and various other open cell and closed cell foams.

Figure 4:
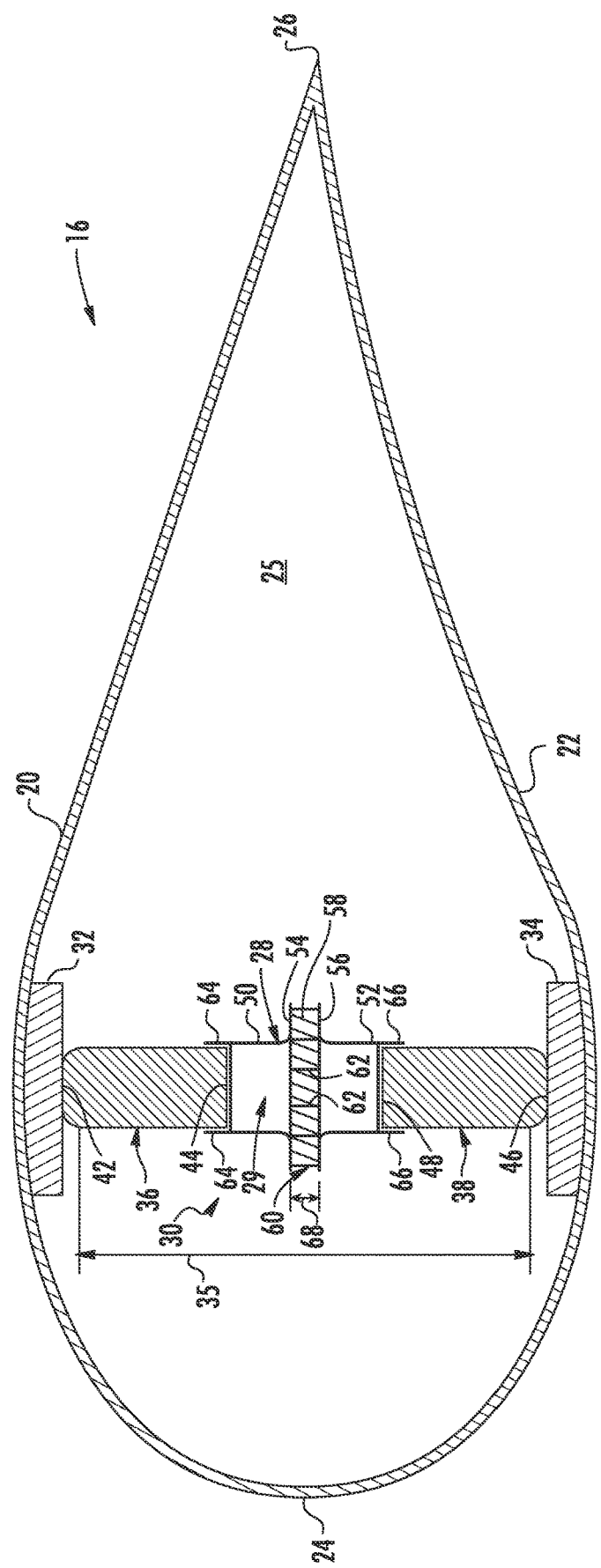
FIG. 4 illustrates a cross-sectional view of another embodiment of a rotor blade of a wind turbine according to the present disclosure.

In addition, as shown in FIGS. 3-4, the shear web 30 may include a first pultruded member 50 and a second pultruded member 52 arranged together at a joint 60. For example, the first pultruded member 50 may include at least one first flange 54. Similarly, the second pultruded member 52 may also include at least one second flange 56. Thus, in such embodiments, the first and second flanges 54, 46 may be aligned and arranged together at the joint 60. More specifically, the shear web 30 may include an adhesive 58 configured at the joint 60 of the first and second flanges 54, 56. In certain embodiments, the adhesive 58 may include any one of or a combination of the following: bond paste, binder, tape, gum, wax, plaster, grout, resin, epoxy, sealant, glue, or similar. In addition, as shown in FIG. 4, the first and second flanges 54, 46 may also include one or more protrusions 62 extending generally perpendicularly therefrom that are configured to provide a predetermined joint thickness 68 when arranged with an opposite flange. Thus, the predetermined joint thickness 68 may be configured to control an adhesive thickness (i.e. an amount of adhesive 58 required for a sufficient bond) between the first and second pultruded members 50, 52 at the joint 60. As such, the protrusions 62 are configured to assist with aligning of the flanges 54, 56 and can also help to minimize adhesive waste.

Still referring to FIGS. 3 and 4, the first and second pultruded members 52, 54 may also include first and second aligning features 64, 66 configured to receive the first and second core components 50, 52, respectively. More specifically, the first and second aligning features 64, 66 may be configured to receive the second ends 44, 48 of the first and second core components 50, 52, respectively. In addition, as shown, the first and second aligning features 64, 66 may include recesses, cavities, notches, or similar, e.g. that can be formed into the first and second pultruded members 50, 52 during the pultrusion process. Thus, the aligning features 64, 66 descried herein are configured to receive and maintain the location of the first and second core components 50, 52.

Figure 5:
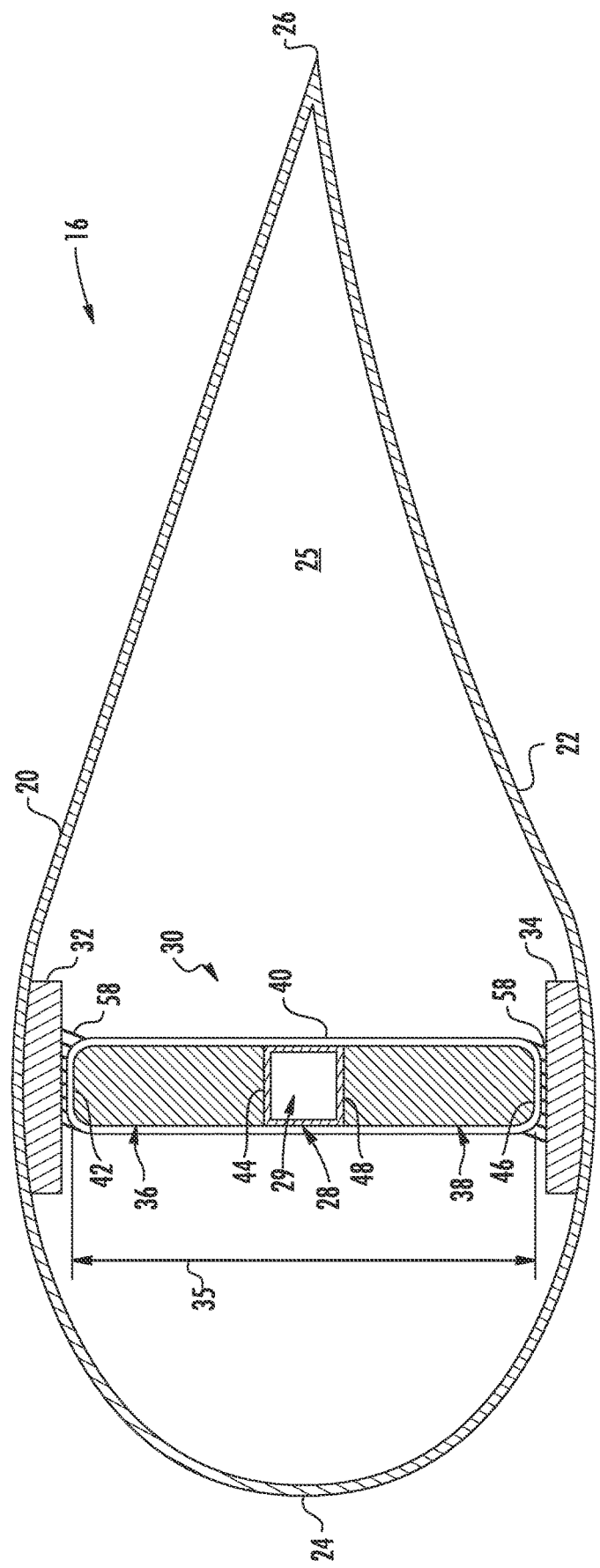
FIG. 5 illustrates a cross-sectional view of yet another embodiment of a rotor blade of a wind turbine according to the present disclosure.

Referring now to FIG. 5, another embodiment of a shear web 30 according to the present disclosure is illustrated. As shown, the shear web 30 includes first and second core components 36, 38 extending longitudinally from opposing spar caps 32, 34 and a pultruded component 28 arranged between the second ends 44, 48 of the first and second core components 36, 38. Further, as shown, the pultruded component 28 has a hollow cross-section 29. In addition, the components of the shear web 30 are enclosed in an outer skin layer 40 and secured to opposing spar 32, 34 via an adhesive 58.

Figure 6:
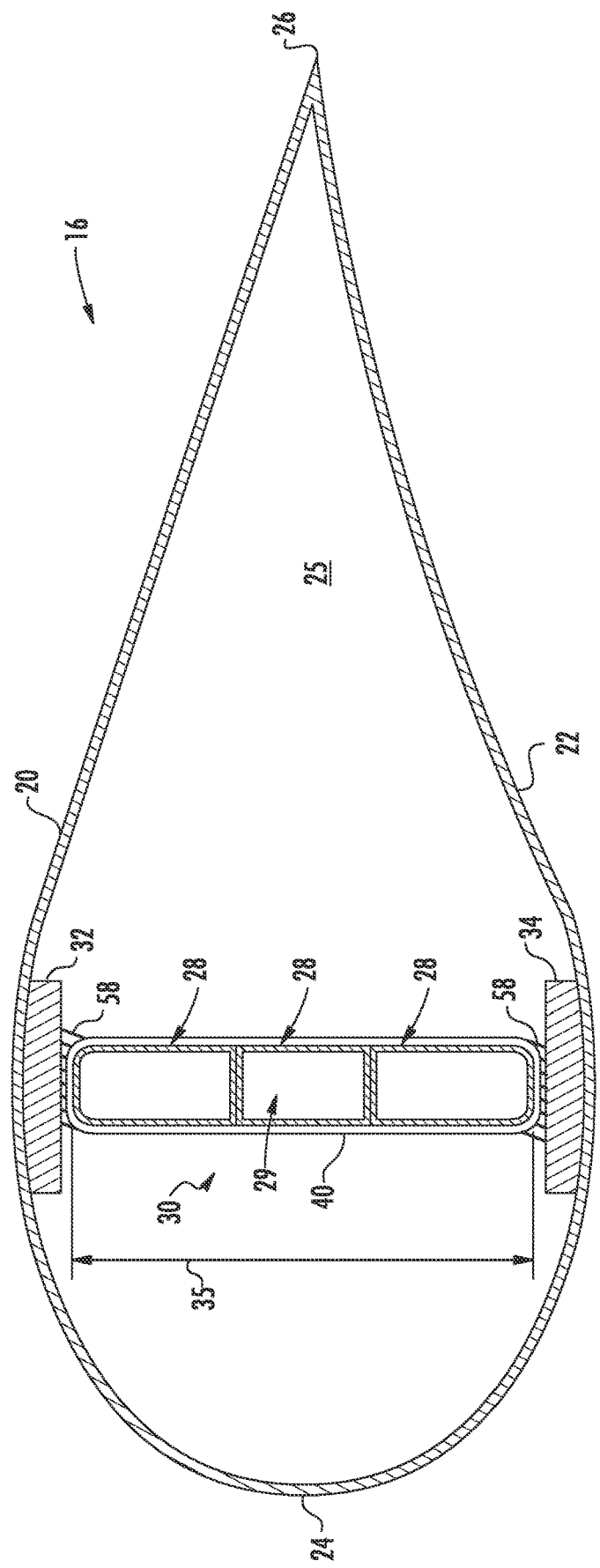
FIG. 6 illustrates a cross-sectional view of still another embodiment of a rotor blade of a wind turbine according to the present disclosure.
Figure 7:
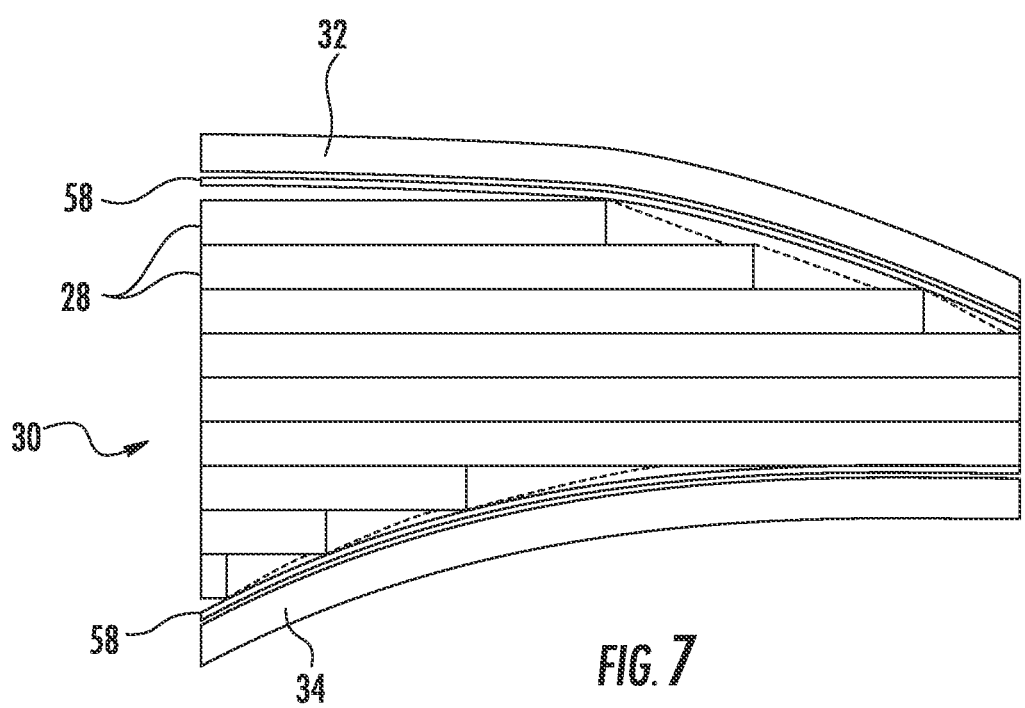
FIG. 7 illustrates a span-wise view of the embodiment of FIG. 6.

Referring now to FIGS. 6 and 7, still another embodiment of a shear web 30 according to the present disclosure is illustrated. As shown, the shear web 30 includes a plurality of pultruded components 28 stacked between the upper and lower shell members 20, 22. In addition, as shown, the components of the shear web 30 are enclosed in an outer skin layer 40 and secured to opposing spar 32, 34 via an adhesive 58. Thus, in such an embodiment, the first and second core components 36, 38 have been eliminated.

Figure 8:
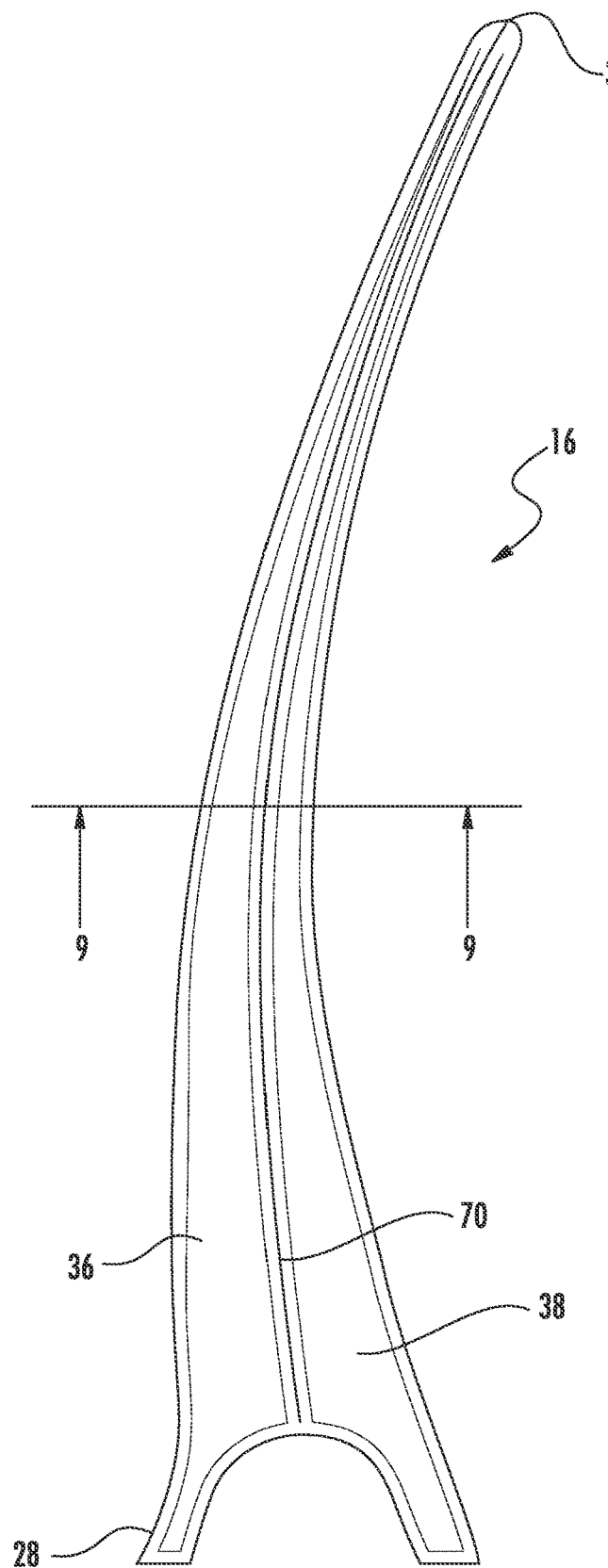
FIG. 8 illustrates a span-wise view of a rotor blade of a wind turbine according to the present disclosure, particularly illustrating a down conductive cable of a lightning protection system of the rotor blade configured therein.
Figure 9:
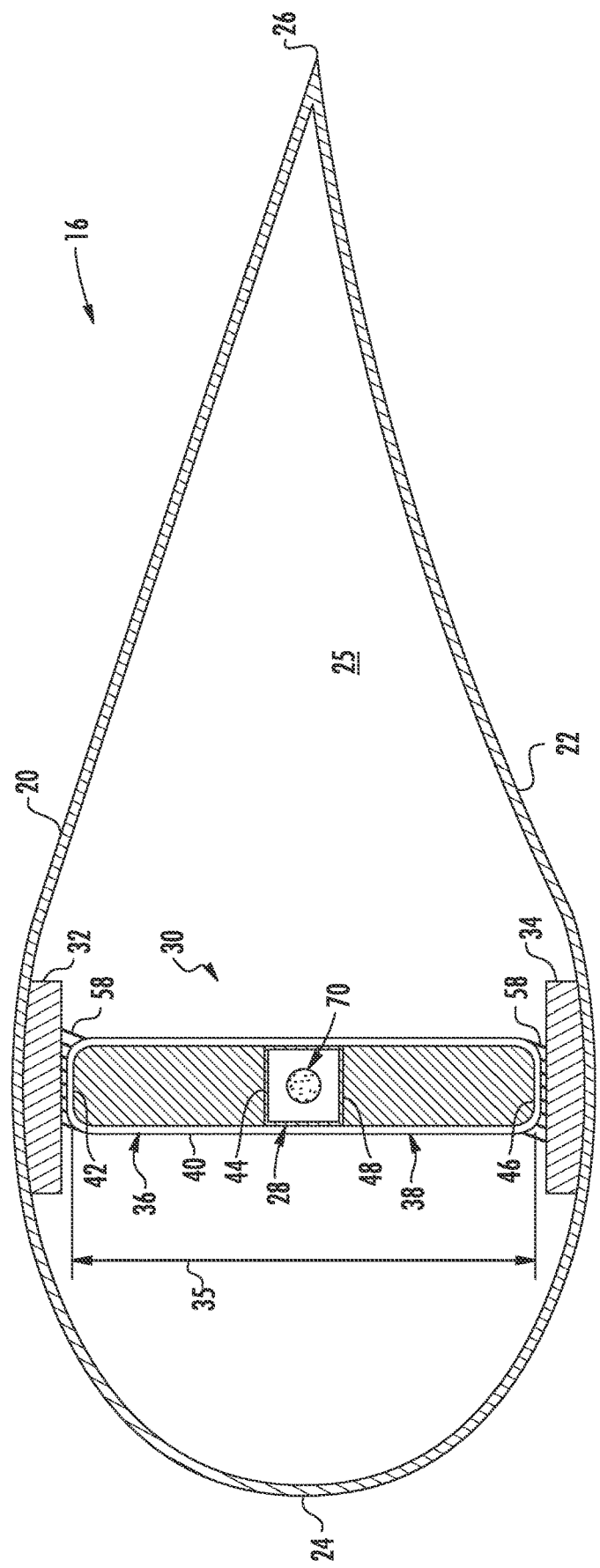
FIG. 9 illustrates a cross-sectional view of the embodiment of FIG. 8 along line 9-9.

Referring now to FIGS. 8 and 9, the shear web 30 as described herein may be configured to accommodate a down conductor cable 70 of a lightning protection system of the wind turbine 10. More specifically, as shown, the down conductor cable 70 may be configured within the hollow cross-section 29 of the structural component 28. For example, as shown in FIG. 8, the down conductor cable 70 may be inserted into the structural component 28 at the blade root portion 28 and pulled through the rotor blade 16 from the blade tip 30. In alternative embodiments, the down conductor cable 70 may be inserted into the structural component 28 at the blade tip and pulled through the rotor blade 16 from the blade root portion 28. In still additional embodiments, the down conductor cable 70 may be inserted into the structural component 28 before the structural component 28 is infused into the shear web 30. Alternatively, the down conductor cable 70 may be inserted into the structural component 28 after the structural component 28 is infused into the shear web 30. In the latter embodiment, a plug and/or cap may be utilized to cover the ends of the structural component 28 so as to prevent resin (or debris) from entering the hollow cross-section 29 of the structural component 28 during infusion. Similarly, in additional embodiments, a cover may be used to cover gaps between segmented structural components 28 so as to prevent resin (or debris) from entering the hollow cross-sections 29 of the structural components 28 during infusion. As such, the down conductor cable 70 can be easily installed, replaced, and/or repaired.

Figure 10:
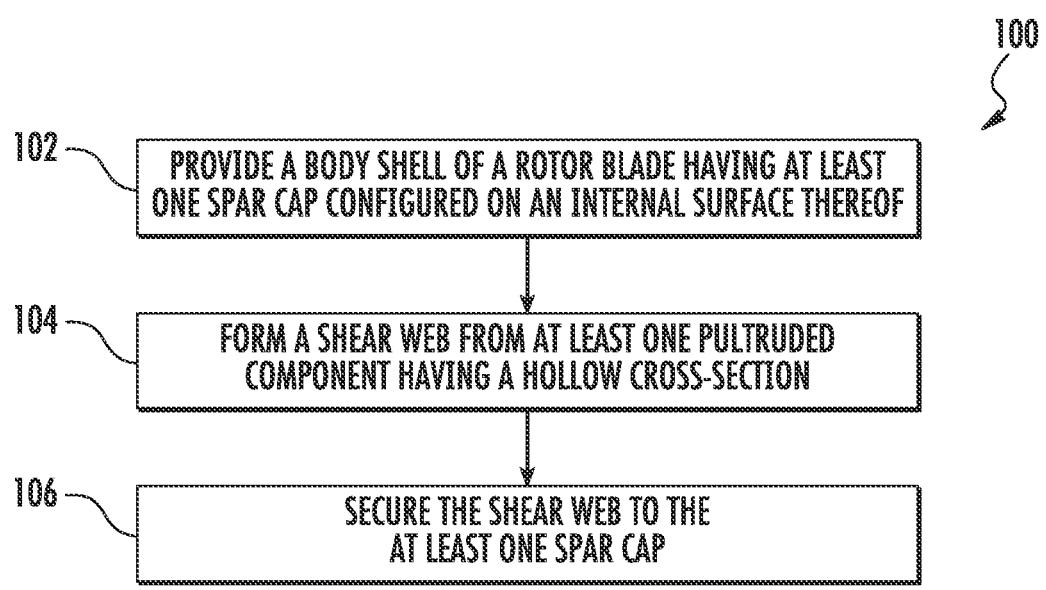
FIG. 10 illustrates one embodiment of a method manufacturing a rotor blade assembly of a wind turbine according to the present disclosure.

Referring now to FIG. 10, a flow diagram of a method for manufacturing a rotor blade assembly of a wind turbine 10 according to the present disclosure is illustrated. As shown at 102, the method 100 includes providing a body shell of a rotor blade 16 having at least one spar cap 32, 34 configured on an internal surface thereof. As shown at 104, the method 100 includes forming a shear web 30 from at least one pultruded component defining a hollow cross-section 29. As shown at 106, the method 100 includes securing the shear web 30 to the at least one spar cap, 32, 34.

In one embodiment, as mentioned, the body shell may include an upper shell member 20 having at least one spar cap 32 configured on an internal surface thereof and a lower shell member 22 having at least one spar cap 34 configured on an internal surface thereof. Thus, in such embodiments, the method 100 may include forming the shear web 30 between the spar caps 32, 34. In another embodiment, the step of securing the shear web 30 to the at least one spar cap may include bonding the shear web 30 to the respective spar caps 32, 34 of the upper and lower shell members 20, 22 via at least one of an adhesive or a resin.

In further embodiments, the step of forming the shear web 30 from at least one pultruded component 28 may also include arranging a plurality of pultruded components 28 between the upper and lower spar caps 32, 34 and placing an outer skin layer 40 at least partially around the plurality of pultruded components 28, e.g. as shown in FIG. 6.

In alternative embodiments, the method 100 may include securing first and second core components 36, 38 to the upper and lower spar caps 32, 34, respectively, positioning at least one pultruded component 28 between the first and second core components 36, 38, and placing an outer skin layer 40 at least partially around the first and second core components 36, 38 and the pultruded component 28 arranged therebetween, e.g. as shown in FIG. 5.

In additional embodiments, the step of forming the shear web 30 from at least one pultruded component 28 may include arranging a first pultruded member 50 with a first core component 36. Further, as mentioned, the first pultruded member 50 includes at least one first flange 54. Thus, the method 100 may also include arranging a second pultruded member 52 with a second core component 38, wherein the second pultruded member 38 includes at least one second flange 54. As such, the method 100 also includes aligning the first and second flanges 54, 56 together at a joint 60 and securing the first and second flanges 54, 56 together. More specifically, in certain embodiments, the step of arranging the first and second pultruded members 50, 52 with the first and second core components 36, 38 may include inserting the first and second core components 36, 38 into aligning features 64, 66 of the first and second pultruded members 50, 52.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A rotor blade assembly for a wind turbine, comprising:
an upper shell member having at least one upper spar cap configured on an internal surface thereof;
a lower shell member having at least one lower spar cap configured on an internal surface thereof; and,
a shear web extending between the upper and lower spar caps along a web axis parallel with a flap-wise direction of the rotor blade assembly, the shear web comprising a plurality of pultruded components including a first and a second and a third pultruded component, the plurality of pultruded components being stacked along the web axis between the upper and lower spar caps so that the second pultruded component is disposed intermediate the first and the third pultruded component, wherein the plurality of pultruded components respectively define a hollow cross-section and each pultruded component of the plurality of pultruded components is constructed, at least in part, of a reinforced composite laminate material, the shear web further comprising an outer skin layer at least partially enclosing the first and the second and the third pultruded component,
wherein the first pultruded component is secured to and extends from the upper spar cap and the third pultruded component is secured to and extends from the lower spar cap.

2. The rotor blade assembly of claim 1, wherein the outer skin layer totally encloses the stacked plurality of pultruded components.

3. The rotor blade assembly of claim 1, further comprising an adhesive, the outer skin layer being attached to the upper spar cap and the lower spar cap with the adhesive along the web axis whereby the secured first pultruded component and the secured third pultruded component is attained.

4. The rotor blade assembly of claim 1, further comprising a lightning protection system comprising a down conductor cable, the down conductor cable configured to be disposed within at least one of the hollow cross-sections of the stacked plurality of pultruded components.

* * * * *